United States Patent
Buschmann et al.

(10) Patent No.: US 10,766,391 B2
(45) Date of Patent: Sep. 8, 2020

(54) PNEUMATIC DEVICE

(71) Applicant: Conti Temic Microelectronic GmbH, Nuremberg (DE)

(72) Inventors: Stefan Buschmann, Ingolstadt (DE); Carsten Sensche, Donauwörth (DE); Dieter Schwab, Kaufering (DE); Gerhard Demmelmeier, Ingolstadt (DE)

(73) Assignee: Conti Temic Microelectronic GmbH (DE)

( * ) Notice: Subject to any disclaimer, the term of this patent is extended or adjusted under 35 U.S.C. 154(b) by 72 days.

(21) Appl. No.: 16/200,791

(22) Filed: Nov. 27, 2018

(65) Prior Publication Data
US 2019/0168651 A1 Jun. 6, 2019

(30) Foreign Application Priority Data
Dec. 5, 2017 (DE) .................. 10 2017 221 921

(51) Int. Cl.
*A47C 3/00* (2006.01)
*B60N 2/90* (2018.01)
*B60N 2/72* (2006.01)

(52) U.S. Cl.
CPC .............. *B60N 2/914* (2018.02); *B60N 2/72* (2013.01)

(58) Field of Classification Search
CPC .......... B60N 2/914; B60N 2/976; B60N 2/90; B60N 2/72; B29L 2031/771; A61H 9/0078; A61H 2201/0103; A61H 2201/0149; A61H 2201/5071; A61H 9/005; A61H 9/00

USPC ......... 297/284.6, 284.4, 284.2, 284.3, 284.1, 297/DIG. 3, DIG. 8; 5/713; 383/3
See application file for complete search history.

(56) References Cited

U.S. PATENT DOCUMENTS

| 4,965,899 A * | 10/1990 | Sekido | B60N 2/665 297/284.6 |
| 5,082,326 A * | 1/1992 | Sekido | B60N 2/914 297/284.6 |
| 5,096,529 A | 3/1992 | Baker | |
| 5,638,565 A * | 6/1997 | Pekar | A47C 4/54 5/653 |

(Continued)

FOREIGN PATENT DOCUMENTS

| DE | 102012203480 A1 | 9/2013 |
| DE | 102013212091 B3 | 10/2014 |
| DE | 102016212586 A1 | 1/2018 |

OTHER PUBLICATIONS

German Examination Report for German Application No. 10 2017 221 921.1, dated Oct. 18, 2018—6 pages.

*Primary Examiner* — Chi Q Nguyen
(74) *Attorney, Agent, or Firm* — RatnerPrestia

(57) ABSTRACT

A pneumatic device for the variation of a contour of a seat bearing surface of a vehicle seat is disclosed. The pneumatic device includes a first foil portion, a second foil portion which is connected to the first foil portion along at least one connecting seam such that a bladder for the variation of the contour of the seat bearing surface, having a bladder chamber which can be filled with pressure medium and having an inflow opening for the inflow of the pressure medium, is formed, and a throttle element, which is arranged in the interior of the bladder chamber and which is designed to throttle a pressure medium flow flowing in through the inflow opening.

19 Claims, 4 Drawing Sheets

(56) References Cited

U.S. PATENT DOCUMENTS

| | | | | |
|---|---|---|---|---|
| 6,212,719 | B1* | 4/2001 | Thomas | A47C 4/54 |
| | | | | 297/284.6 |
| 6,273,810 | B1* | 8/2001 | Rhodes, Jr. | A47C 4/54 |
| | | | | 454/120 |
| 9,428,081 | B2 | 8/2016 | Riepl et al. | |
| 9,751,440 | B2* | 9/2017 | Dry | B60N 2/5642 |
| 9,802,518 | B2 | 10/2017 | Steinberger et al. | |
| 10,214,129 | B2* | 2/2019 | Jaranson | B60N 2/914 |
| 2006/0085919 | A1* | 4/2006 | Kramer | A47C 27/082 |
| | | | | 5/713 |
| 2006/0217644 | A1* | 9/2006 | Ozaki | A61H 9/0078 |
| | | | | 601/148 |
| 2011/0203589 | A1* | 8/2011 | Fenton | A61M 16/0072 |
| | | | | 128/205.13 |
| 2015/0025425 | A1* | 1/2015 | Mitchell | A61H 1/008 |
| | | | | 601/96 |
| 2015/0126916 | A1* | 5/2015 | Hall | B60N 2/42 |
| | | | | 601/149 |
| 2018/0093593 | A1* | 4/2018 | Beuschel | F04B 39/0055 |

\* cited by examiner

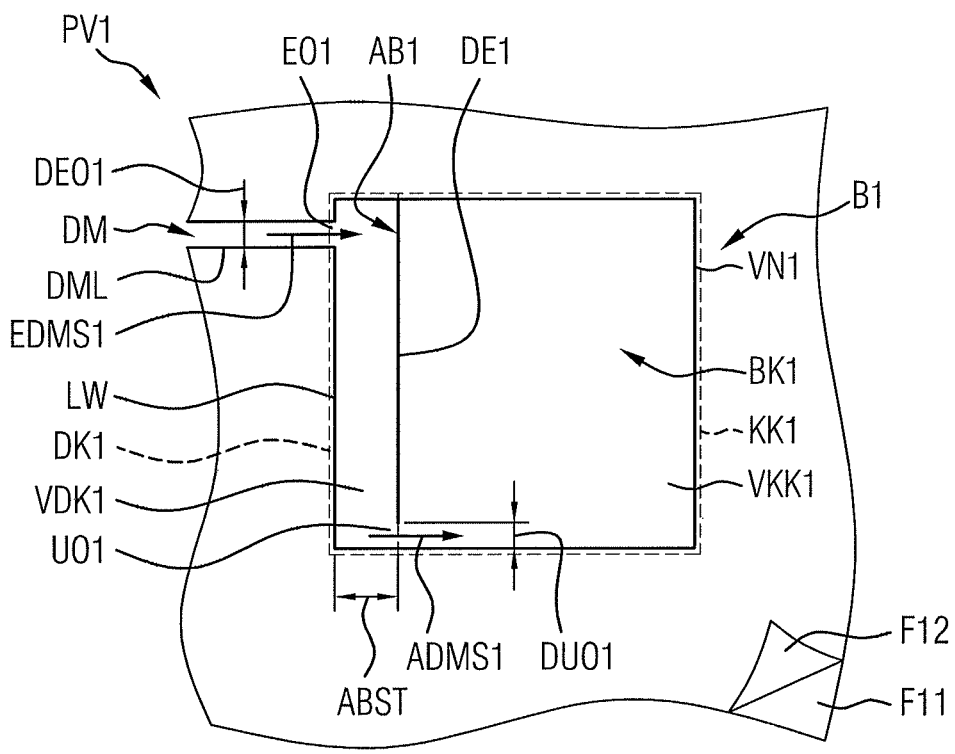
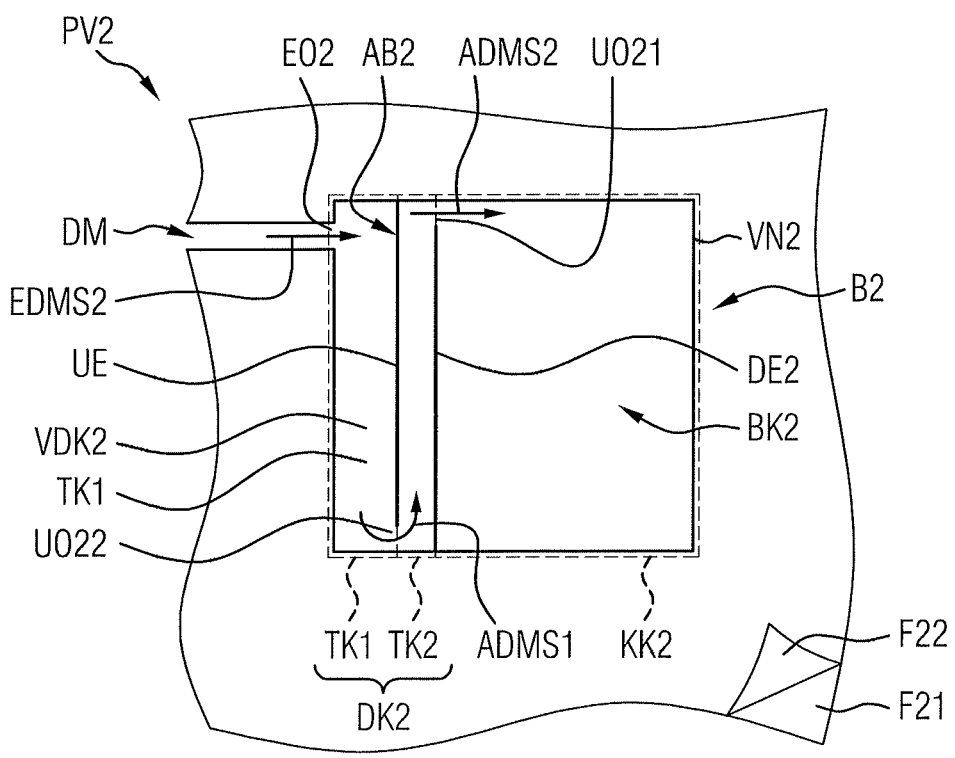

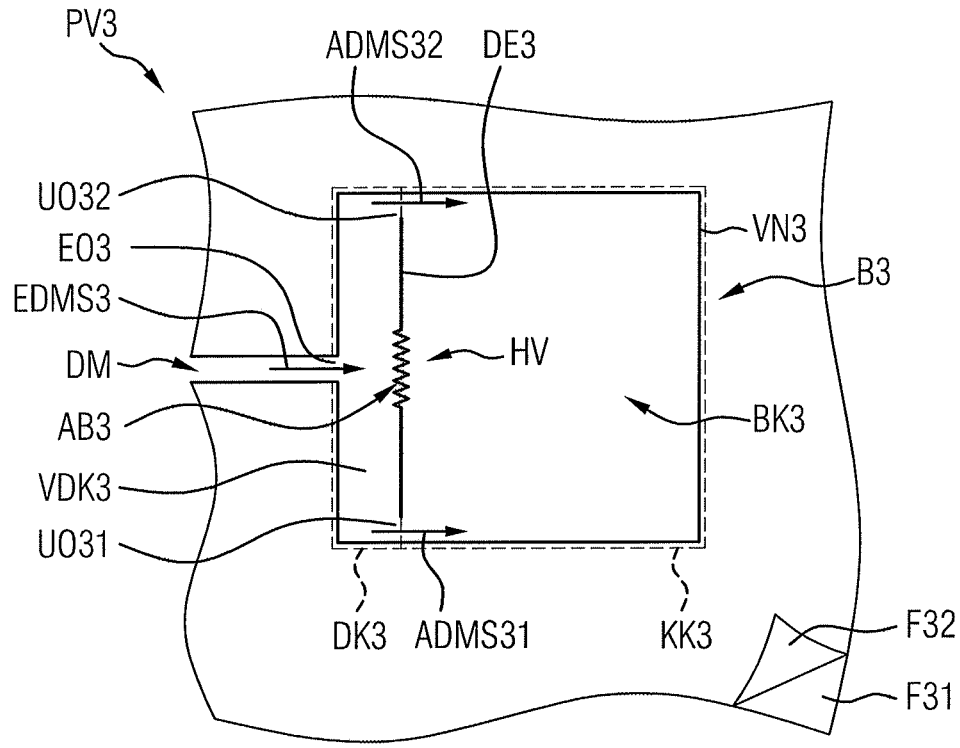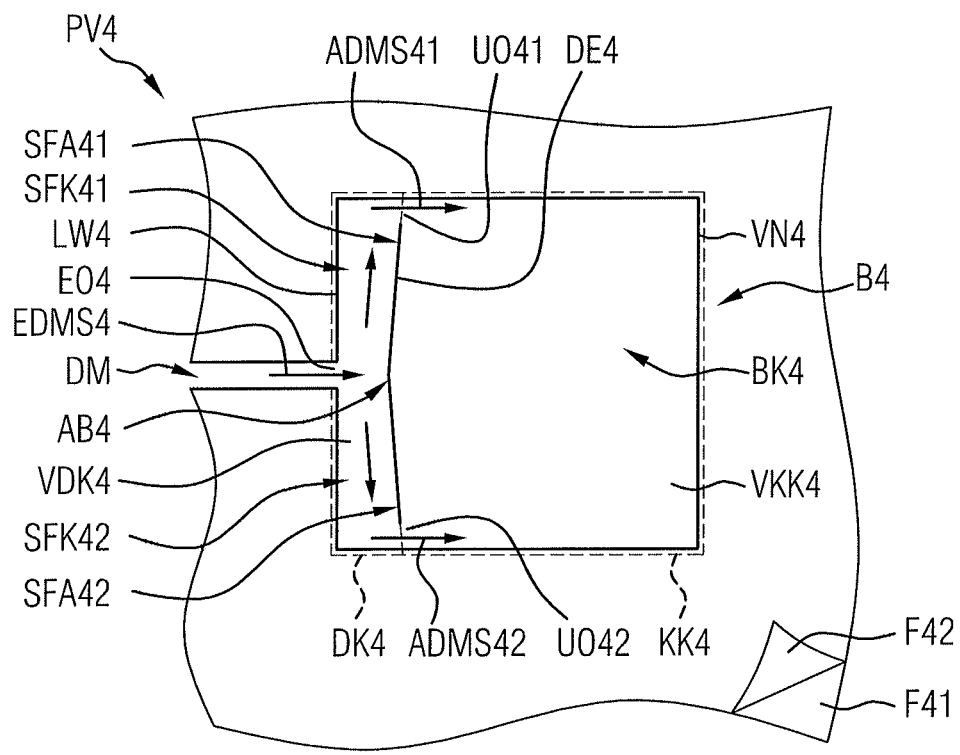

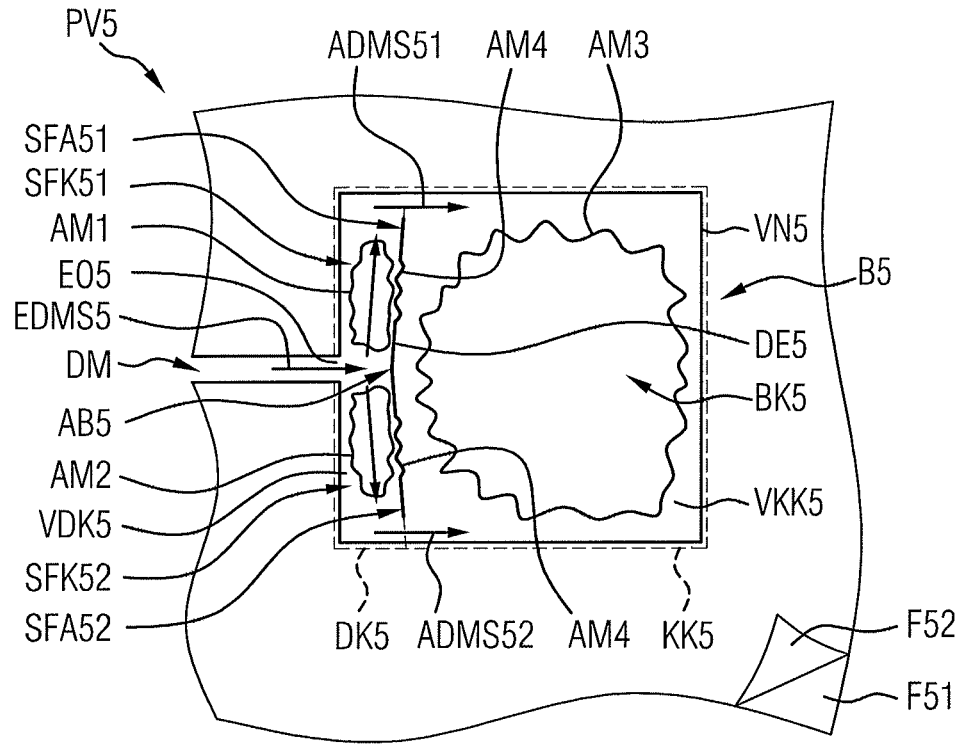
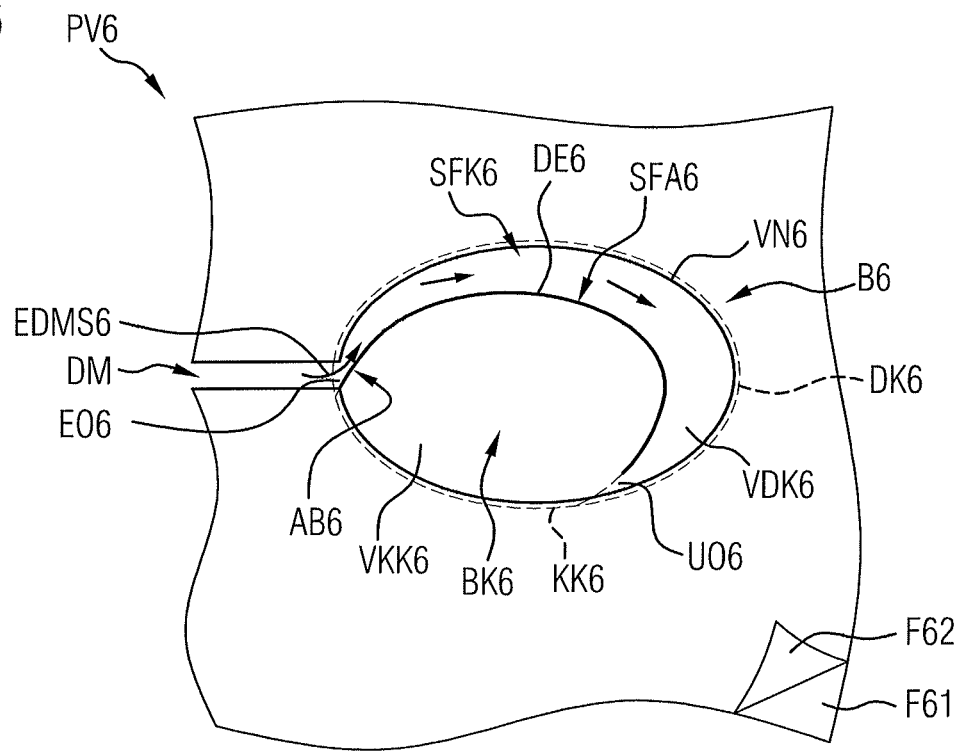

PNEUMATIC DEVICE

CROSS REFERENCE TO RELATED APPLICATIONS

This application claims priority to German Patent Application No. 10 2017 221 921.1, filed Dec. 5, 2017, the contents of such application being incorporated by reference herein.

FIELD OF THE INVENTION

The present invention relates to a pneumatic device for the variation of a contour of a seat bearing surface of a vehicle seat. The present invention also relates to a vehicle seat having a pneumatic device of said type. Finally, the invention relates to a method for producing a pneumatic device of said type for the variation of a contour of a seat bearing surface of a vehicle seat.

BACKGROUND OF THE INVENTION

In modern vehicle seats, bladders which can be filled with a pressure medium, in particular with a gaseous pressure medium such as compressed air, are situated as actuating elements in the region of the seat surface or backrest (together also referred to as seat bearing surface). Such bladders can be supplied with the pressure medium via a respective pressure medium line. By means of the filling or evacuation of a respective bladder with pressure medium, the volume thereof is increased or decreased, such that in this way the characteristics of the seat bearing surface, in particular the contour thereof, can be varied. For the filling of the respective bladder with pressure medium, the pressure medium is firstly generated by a pressure medium source, for example by a compressor or a compressor unit, and guided by a corresponding valve, in particular an electropneumatic valve, of a control unit to a respective bladder.

It has however been found that noises generated for example in the valve can be transmitted via the pressure medium line to the bladder and radiated from there into the surroundings. Such noises can be perceived as disturbing and should therefore be avoided.

Known methods for reducing the noise emissions provide a silencer between the valve and the bladder. In the case of such a silencer being used between valve and bladder, additional components and additional assembly steps are however required.

SUMMARY OF THE INVENTION

An aspect of the invention is a pneumatic device for the variation of a contour of a seat bearing surface of a vehicle seat, in the case of which a propagation of sound via the bladder is reduced or minimized with minimized outlay in terms of method and device.

According to a first aspect of the invention, a pneumatic device for the variation of a contour of a seat bearing surface of a vehicle seat is created. The pneumatic device comprises a first foil portion, a second foil portion, which is connected to the first foil portion along at least one connecting seam such that a bladder for the variation of the contour of the seat bearing surface, having a bladder chamber which can be filled with pressure medium and having an inflow opening for the inflow of the pressure medium into the bladder chamber, is formed. The pneumatic device furthermore comprises a throttle element which is arranged in the interior of the bladder chamber and which is designed to throttle, within the bladder chamber, a pressure medium flow flowing in through the inflow opening. Through this provision of the throttle element in the interior of the bladder chamber, a pressure medium flow flowing into the bladder chamber can be throttled, such that a propagation of sound via the bladder is reduced or minimized. Furthermore, through the provision of the throttle element in the interior of the bladder chamber, an additional silencer is omitted, whereby the outlay in terms of method and device is minimized. Additional interfaces that would be necessary in the case of the provision of an additional silencer are also avoided. In this way, it is for example possible for the risk of leaks to be reduced.

In one refinement of the pneumatic device, the throttle element divides the bladder chamber into a damping chamber, which has the inflow opening, and a contour variation chamber, which is connected to the damping chamber via a flow transfer opening and which serves for the variation of the contour of the seat bearing surface. Furthermore, the flow transfer opening is designed such that the pressure medium flow flowing into the damping chamber through the inflow opening is throttled as it passes from the damping chamber into the contour variation chamber. By means of this refinement, in the interior of the bladder chamber, a damping chamber or a damping volume is created which acts as a silencer, such that a propagation of sound via the bladder, in particular via the contour variation chamber, is reduced.

In a further refinement, a volume of the damping chamber lies in a range from 0.1% to 30%, in particular 3% to 15%, of a volume of the contour variation chamber. By means of this refinement, it is ensured that, during the filling of the bladder chamber, the damping chamber contained in the bladder chamber is not perceived by the seat occupant as disturbing.

In a further refinement, the inflow opening and the flow transfer opening have no overlap region in a flow direction of the pressure medium flow. By means of this refinement, an unhindered propagation of sound on a straight path from the inflow opening to the flow transfer opening is prevented.

In a further refinement, a flow cross section of the flow transfer opening is in a range from 10% to 80%, preferably 20% to 50%, particularly preferably 30% to 40%, of a flow cross section of the inflow opening. If the flow transfer opening is formed with a smaller flow cross section than the inflow opening or as a constriction, the throttling action can be improved, and thus the sound propagation as the pressure medium flow passes from the damping chamber into the contour variation chamber can be further minimized.

In a further refinement, the throttle element has a flow impingement region which is directly impinged on by the pressure medium flow flowing in through the inflow opening. A "direct" impingement of flow means that the inflowing pressure medium flow strikes the flow impingement region directly, that is to say without passing a further element. By means of this refinement, the inflowing pressure medium flow is slowed in an effective manner, such that a propagation of sound can be further reduced.

In a further refinement, the flow impingement region has a structure with depressions and elevations, which structure gives rise to a diffuse distribution of the pressure medium flow. By means of this refinement, the pressure medium flow is, after striking the structure, distributed in all directions.

In a further refinement, the throttle element has a flow-guiding portion for the guidance of the pressure medium flow. The flow-guiding portion is preferably designed so as to form, with a wall of the bladder chamber, in particular with a wall of the damping chamber, a flow-guiding channel which widens in the flow direction of the pressure medium flow. By means of this refinement, the pressure medium flow is additionally decelerated in the flow direction, such that the propagation of sound can be further reduced.

In a further refinement, the throttle element is formed by connection of the first foil portion and of the second foil portion. For example, the throttle element may be formed by direct connection of the first foil portion and of the second foil portion, for example by welding, in particular high-frequency welding, of the first and second foil portion (that is to say through the formation of a weld seam between the first and the second foil portion). It is however also possible for the first foil portion and the second foil portion to be adhesively bonded, or directly connected in some other way, to one another. It is also possible for the first foil portion and the second foil portion to be connected indirectly to one another, for example via a web which is connected to the first foil portion and to the second foil portion, or via a stroke limiter, which is connected to the first foil portion and to the second foil portion and which can limit a stroke of the bladder chamber. Moreover, it is possible for the throttle element to be formed by an external connection of the first foil portion and of the second foil portion for example by means of an external clamp.

In a further refinement, the throttle element has a sound-absorbing material. Such a material may for example be a porous material such as mineral wool, glass wool or the like, which partially absorbs sound energy or converts said sound energy into heat.

In a further refinement, it is however also possible for the damping chamber and/or the contour variation chamber to have an additional element with a sound-absorbing material of said type.

In a further refinement, the pneumatic device furthermore has a damping chamber division element which divides the damping chamber into a first partial chamber and a second partial chamber connected to the first partial chamber. Here, the damping chamber division element is designed to generate a throttling effect between the first partial chamber and the second partial chamber. By means of this refinement, a propagation of sound in particular in the damping chamber is further minimized. It is conceivable here for the damping chamber division element to be designed similarly to the throttle element. That is to say, the damping chamber division element may also have a flow impingement region and/or a flow-guiding portion, which leads to a flow deceleration for example in the first partial chamber and effects throttling of the pressure medium flow as it passes from the first partial chamber into the second partial chamber. It is self-evidently also possible for the damping chamber division element to have a sound-absorbing material in order to further minimize the propagation of sound.

According to a second aspect of the invention, a vehicle seat is created. The vehicle seat has a seat bearing surface for a user of the vehicle seat, and has a pneumatic device in accordance with the description above, or a refinement thereof. Here, the pneumatic device is arranged in the vehicle seat so as to vary the contour of the seat bearing surface. In this way, a vehicle seat is created which has a pneumatic device which is easy to produce and which, owing to the integrated throttle element, exhibits reduced propagation of sound via the bladder.

According to a third aspect of the invention, a method for producing a pneumatic device for the variation of a contour of a seat bearing surface of a vehicle seat is created. In this method, a first foil portion is provided and a second foil portion is provided. Furthermore, the first foil portion and the second foil portion are connected along at least one first connecting seam in order to form a bladder for the variation of the contour of the seat bearing surface of the vehicle seat, having a bladder chamber which can be filled with pressure medium and having an inflow opening for the inflow of the pressure medium into the bladder chamber. Furthermore, the first foil portion and the second foil portion are connected along at least one second connecting seam in order to form a throttle element arranged within the bladder chamber, which throttle element is designed to throttle, within the bladder chamber, a pressure medium flow flowing in through the inflow opening. In this way, a method for producing a pneumatic device, which exhibits reduced sound propagation, by means of minimized outlay in terms of method and device is created, in particular because no additional silencer needs to be used here.

In one refinement of the method, the first foil portion and the second foil portion are connected to one another along the at least one second connecting seam such that the bladder chamber is divided into a damping chamber, which has the inflow opening, and a contour variation chamber, which is connected to the damping chamber via a flow transfer opening and which serves for the variation of the contour of the seat bearing surface, and the flow transfer opening throttles the pressure medium flow entering the damping chamber through the inflow opening as said pressure medium flow passes from the damping chamber into the contour variation chamber. In this refinement, a pressure medium flow flowing in through the inflow opening is throttled as it passes from the damping chamber into the contour variation chamber (that is to say as the flow passes through the flow transfer opening). Here, a pressure medium volume flow entering the contour variation chamber via the flow transfer opening may be several times smaller than a pressure medium volume flow entering the damping chamber via the inflow opening, such that a propagation of sound in particular via the contour variation chamber can be minimized.

Advantageous refinements of the pneumatic device, where applicable to the vehicle seat and the method, are also to be regarded as advantageous refinements of the vehicle seat and of the method, and vice versa.

BRIEF DESCRIPTION OF THE DRAWINGS

Exemplary embodiments of the invention will now be explained in more detail below with reference to the accompanying drawings, in which:

FIG. 1 shows a schematic plan view of a pneumatic device as per an embodiment of the invention;

FIG. 2 shows a schematic plan view of a pneumatic device as per a further embodiment of the invention;

FIG. 3 shows a schematic plan view of a pneumatic device as per a further embodiment of the invention;

FIG. 4 shows a schematic plan view of a pneumatic device as per a further embodiment of the invention;

FIG. 5 shows a schematic plan view of a pneumatic device as per a further embodiment of the invention;

FIG. 6 shows a schematic plan view of a pneumatic device as per a further embodiment of the invention.

DETAILED DESCRIPTION OF THE PREFERRED EMBODIMENTS

Figure 7:
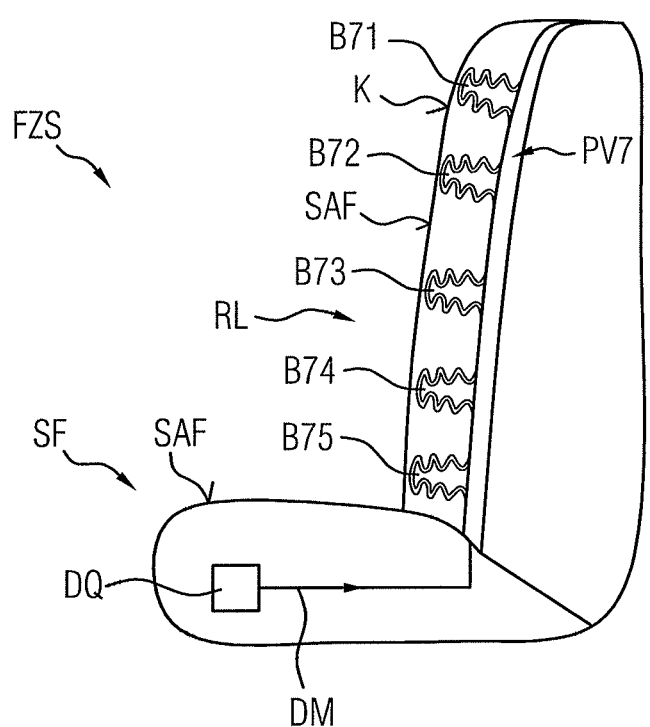
FIG. 7 is a schematic illustration of a vehicle seat as per an embodiment of the invention, in which, in a seat bearing surface of the vehicle seat, pneumatic devices for the variation of a contour of the seat bearing surface are arranged in the region of the backrest.

Reference is made firstly to FIG. 1, which illustrates a schematic plan view of a pneumatic device PV1 in particular for the variation of a contour of a seat bearing surface of a vehicle seat. The pneumatic device PV1 may self-evidently also be used for other applications.

The pneumatic device PV1 has a first foil portion F11 and a second foil portion F12. The second foil portion F12 is arranged adjacent to the first foil portion F11, in particular on or under the first foil portion F11. The first foil portion F11 and the second foil portion F12 are connected to one another along a connecting seam VN1, such that a bladder B1 having a bladder chamber BK1, which can be filled with pressure medium, and an inflow opening EO1 for the inflow of the pressure medium DM into the bladder chamber BK1 is formed. The pressure medium DM may flow into the bladder chamber BK1 for example via a pressure medium line DML, which in this case is for example likewise formed by a connecting seam between the first foil portion F11 and the second foil portion F12, and through the inflow opening EO1.

Arranged in the interior of the bladder chamber BK1 is a throttle element DE1, which throttles, within the bladder chamber BK1, a pressure medium flow EDMS1 flowing in through the inflow opening EO1. In this specific example of FIG. 1, the throttle element DE1 is formed by a weld seam between the first foil portion F11 and the second foil portion F12. It is self-evidently also possible to form the throttle element DE1 by means of other connecting methods, for example by adhesive bonding of the first and second foil portions F11, F12 or through the use of an external clamp which connects the first foil portion F11 and the second foil portion F12 to one another.

The throttle element DE1 divides the bladder chamber BK1 into a damping chamber DK1, which has the inflow opening EO1, and a contour variation chamber KK1, which is connected to the damping chamber DK1 via a flow transfer opening UO1. The contour variation chamber KK1 is in particular designed for the variation of the contour of the seat bearing surface. The flow transfer opening UO1 between the damping chamber DK1 and the contour variation chamber KK1 is in this case designed such that the pressure medium flow EDMS1 flowing through the inflow opening EO1 into the damping chamber DK1 is throttled as it passes from the damping chamber DK1 into the contour variation chamber KK1. For example, a flow cross section or a diameter DUO1 of the flow transfer opening UO1 can be in a range from 10% to 80%, preferably 20% to 50%, particularly preferably 30% to 40%, of a flow cross section or of a diameter DEO1 of the inflow opening EO1.

Through the provision of the throttle element DE1, a damping volume, in the form of the damping chamber DK1, and a constriction, in the form of the flow transfer opening UO1, are created in the interior of the bladder chamber BK1. This leads to a throttling or deceleration of the inflowing pressure medium flow EDMS1 as it passes from the damping chamber DK1 to the contour variation chamber KK1. In particular because the flow transfer opening UO1 is formed as a constriction, a pressure medium volume flow of the pressure medium exiting the damping chamber DK1 (labelled here by way of example as emerging pressure medium flow ADMS1) is several times smaller than the pressure medium flow EDMS1 flowing into the damping chamber DK1 via the inflow opening EO1. It is thus possible to reduce a propagation of sound from the pressure medium lines DML to the contour variation chamber KK1, whereby, in particular, noises that arise during the filling of the bladder B1 can be minimized or eliminated.

As shown in FIG. 1, a volume VDK1 of the damping chamber DK1 is several times smaller than a volume VKK1 of the contour variation chamber KK1. In the specific example, the volume VDK1 of the damping chamber DK1 is approximately one quarter of the volume VKK1 of the contour variation chamber KK1. In other embodiments, the volume VVK1 may lie in a range from 0.1% to 30%, in particular in a range from 3% to 15%, of the volume VKK1. It is essential here that the volume VDK1 is several times smaller than the volume VKK1, such that, in particular during the filling of the bladder B1, a disturbing sensation for the seat occupant owing to an expansion of the damping chamber DK1 is avoided. By virtue of a volume VDK1 of the damping chamber DK1 being several times smaller than a volume VKK1 of the contour variation chamber KK1, it is the case for example during the inflation of the bladder B1 that a contour of the seat bearing surface will change substantially only in the region of the contour variation chamber KK1, such that a seat occupant does not sense the damping chamber DK1.

In the specific example of FIG. 1, the throttle element DE1 is furthermore spaced apart by a distance ABST from a left-hand wall LW of the bladder chamber BK1, wherein the distance ABST is larger than the flow cross section or diameter DEO1 of the inflow opening EO1.

As can furthermore be seen in FIG. 1, the inflow opening EO1 and the flow transfer opening UO1 have no overlap region in the flow direction of the pressure medium flow. In this way, an unhindered propagation of sound on a straight path or straight flow path between the inflow opening EO1 and the flow transfer opening UO1 is avoided, whereby a transmission of sound between the pressure medium line DML and the contour variation chamber KK1 can be further minimized.

As can also be seen in FIG. 1, the throttle element DE1 has a flow impingement region AB1, which is impinged on directly, that is to say without an interposed element being impinged on, by the pressure medium flow EDMS1 flowing in through the inflow opening EO1. As a result of the impingement on the throttle element DE1, the inflowing pressure medium flow EDMS1 is decelerated in an effective manner.

In FIG. 1, the bladder B1 and the throttle element DE1 furthermore have a design which yields the least possible waste during the manufacture of the pneumatic device PV1.

Reference is now made to FIG. 2, which shows a schematic plan view of a further embodiment of a pneumatic device PV2.

As in the case of the pneumatic device PV1 of FIG. 1, it is also the case here that a bladder B2 is formed by a connecting seam VN2 between a first foil portion F21 and a second foil portion F22, and a throttle element DE2 is arranged in the interior of the bladder chamber BK2 in order to divide the bladder chamber BK2 into a damping chamber DK2 and a contour variation chamber KK2. As can be seen, the throttle element DE2 also has a flow impingement region AB2, similar to the flow impingement region AB1 of FIG. 1.

By contrast to the pneumatic device PV1 of FIG. 1, the pneumatic device PV2 of FIG. 2 however has a damping chamber division element UE, which divides the damping chamber DK2 (having a volume VDK2) into a first partial chamber TK1 and a second partial chamber TK2. The damping chamber division element UE is in this case formed such that, in this case too, a throttling effect between the first partial chamber TK1 and the second partial chamber TK2 is generated. In particular, the damping chamber division element UE is designed such that a flow transfer opening UO22 is formed between the first partial chamber TK1 and the second partial chamber TK2, which flow transfer opening throttles a pressure medium flow EDMS2 entering through the inflow opening EO2 as said pressure medium flow passes from the first partial chamber TK1 into the second partial chamber TK2. Further throttling takes place, as already described in conjunction with the pneumatic device PV1, as the pressure medium flow passes from the second partial chamber TK2 into the contour variation chamber KK2 through the flow transfer opening UO21 (labelled here by way of example as emerging pressure medium flow ADMS2). By virtue, in particular, of the damping chamber DK2 being further divided, it is possible to achieve an additional throttling effect or an additional flow deceleration of the inflowing pressure medium flow EDMS2 as it passes into the contour variation chamber KK2.

Both the throttle element DE2 and the damping chamber division element UE and also the bladder B2 itself can be produced in a single method step (for example in one welding process).

Reference is now made to FIG. 3, which shows a schematic plan view of a further embodiment of a pneumatic device PV3.

As in the case of the pneumatic device PV1 of FIG. 1, it is also the case here that a bladder B3 is formed by a connecting seam VN3 between a first foil portion F31 and a second foil portion F32.

In relation to the pneumatic device PV1 of FIG. 1, it is also the case here that pneumatic device PV3 has a throttle element DE3, which divides the bladder chamber BK3 into a damping chamber DK3 (having a volume VDK3) and a contour variation chamber KK3.

By contrast to the pneumatic device PV1 of FIG. 1, the pneumatic device PV3 of FIG. 3 however has two flow transfer openings UO31, UO32 between the damping chamber DK3 and the contour variation chamber KK3. In this way, the pressure medium flow EDMS3 flowing in through the inflow opening EO3 is divided up between the flow transfer openings UO31, UO32, such that two pressure medium flows ADMS31, ADMS32 flow into the contour variation chamber KK3.

As is also shown in FIG. 3, the throttle element DE3 has a flow impingement portion AB3, which has a structure with depressions and elevations HV. As a result of the impingement on the structure with depressions and elevations HV, the inflowing pressure medium flow EDMS3 is distributed in a diffuse manner after the impingement on the structure HV, whereby a direct propagation of sound to the contour variation chamber KK3 can be reduced. Structures other than the zigzag structure HV that is shown are self-evidently also possible, for example undulating structures, three-dimensional structures or the like, as long as said structures cause the pressure medium flow EDMS3 to be distributed, in particular distributed in a diffuse manner.

Reference is now made to FIG. 4, which shows a further embodiment of a pneumatic device PV4.

As in the case of the pneumatic device PV3 of FIG. 3, it is also the case here that a bladder B4 is formed by a connecting seam VN4 between a first foil portion F41 and a second foil portion F42.

In relation to the pneumatic device PV3 of FIG. 3, it is also the case here that the pneumatic device PV4 has a throttle element DE4, which divides the bladder chamber BK4 into a damping chamber DK4 (having a volume VDK4) and a contour variation chamber KK4 (having a volume VKK4) with two flow transfer openings UO41, UO42.

By contrast to the pneumatic device PV4 of FIG. 1, the throttle element DE4 however has not only a flow impingement portion AB4 but also a flow-guiding portion SFA41, SFA42, which, with a left-hand wall LW4 of the bladder chamber BK4 and with a wall of the damping chamber DK4, respectively forms a flow-guiding channel SFK41 and SFK42 which widens in the flow direction. By means of this flow-guiding channel SFK41, SFK42 which widens in the flow direction of the pressure medium flow, the pressure medium flow EDMS4 flowing in through the inflow opening EO4 is further decelerated before it passes through the passage openings UO41, UO42 (labelled here by way of example as emerging pressure medium flows ADMS41, ADMS42) into the contour variation chamber KK4.

The throttle element DE4 may self-evidently, in other embodiments, have a design other than the V-shaped design shown, in order to form a flow-guiding channel which widens in a flow direction of the pressure medium flow. A U-shaped design of the throttle element DE4 is for example also possible.

Reference is now made to FIG. 5, which shows a plan view of a further embodiment of a pneumatic device PV5.

As in the case of the pneumatic device PV4 of FIG. 4, it is also the case here that a bladder B5 is formed by a connecting seam VN5 between a first foil portion F51 and a second foil portion F52.

In relation to the pneumatic device PV4 of FIG. 4, it is also the case here that the pneumatic device PV5 has a throttle element DE5, which divides the bladder chamber BK5 into a damping chamber DK5 (having a volume VDK5) and a contour variation chamber KK5 (having a volume VKK5).

As is also shown in FIG. 5, the throttle element DE5 has a flow impingement portion AB5.

In relation to the pneumatic device PV4 of FIG. 4, it is also the case here that the throttle element DE5 has a substantially V-shaped design, with a flow-guiding portion SFA51, SFA52, which forms a flow-guiding channel SFK51 and SFK52, which widens in the flow direction of the pressure medium flow, with a wall of the damping chamber DK5.

As in the case of pneumatic device PV4, by means of this flow-guiding channel SFK51, SFK52 which widens in the flow direction of the pressure medium flow, the pressure medium flow EDMS5 flowing in through the inflow opening EO5 is further decelerated before it passes through passage openings (labelled here by way of example as emerging pressure medium flows ADMS51, ADMS52) into the contour variation chamber KK5.

By contrast to the pneumatic device PV4 of FIG. 4, the pneumatic device PV5 of FIG. 5 has, in the damping chamber DK5, an element AM1, AM2 with a sound-absorbing material. Such a material may be a porous material such as for example mineral wool, glass wool or the like, which absorbs sound energy or converts said sound energy into heat. As can also be seen in FIG. 5, the contour variation chamber KK5 also has such an element AM3 with a sound-absorbing material, which may be similar to the elements AM1, AM2.

Furthermore, the throttle element DE5 likewise has a sound-absorbing material AM4 or a portion or portions with a sound-absorbing material AM4. For example, said portions may be elastic portions of the throttle element DE5.

Reference is now made to FIG. 6, which shows a plan view of a further embodiment of a pneumatic device PV6.

By contrast to the pneumatic devices PV1 to PV5 shown above, the bladder B6 of the pneumatic device PV6 is illustrated here by way of example as an oval bladder and not as a rectangular bladder as described in conjunction with the pneumatic devices PV1 to PV5. Aspects of the present invention are thus not restricted to rectangular bladders or oval bladders. Rather, a wide variety of shapes of bladders is conceivable.

As is also the case in the pneumatic device PV1 to PV5, the pneumatic device PV6 also has a bladder B6 (formed by a connecting seam VN6 between a first foil portion F61 and a second foil portion F62) with a bladder chamber BK6, which is divided by a throttle element DE6 into a damping chamber DK6 (having a volume VDK6) and a contour variation chamber KK6 (having a volume VKK6). The throttle element DE6 has a flow impingement region AB6 and, adjoining the latter, a flow-guiding portion SFA6 which, with a wall of the bladder chamber BK6, forms a flow-guiding channel SFK6 which widens in the flow direction. The throttle element DE6 is designed such that a flow transfer opening UO6 is formed between the damping chamber DK6 and the contour variation chamber KK6, such that a pressure medium flow EDMS6 entering through the inflow opening EO6 firstly impinges on the flow impingement region AB6, is then guided by the flow-guiding portion SFA6 and finally, as it flows through the flow transfer opening UO6, passes from the damping chamber DK6 into the contour variation chamber KK6.

The pneumatic device PV6 thus shows a possible embodiment in which a throttle element DE6 can be used in a non-rectangular bladder to throttle a pressure medium flow in the interior of the bladder chamber BK6.

It is self-evidently possible for the characteristic features of the pneumatic devices PV1 to PV5 already described in conjunction with FIG. 1 to FIG. 5, such as for example the presence of an additional damping chamber division element, the presence of multiple flow transfer openings, the presence of a flow impingement region with a structure with depressions and elevations, and the presence of elements with a sound-absorbing material (in the damping chamber and/or the contour variation chamber and in the throttle element), to be combined with the pneumatic device PV6.

Reference is finally made to FIG. 7, which shows a vehicle seat FZS. The vehicle seat FZS comprises a backrest RL and a seat surface SF, which are together also referred to as seat bearing surface SAF of the vehicle seat FZS. In the vehicle seat FZS, in the region of the backrest RL, there is furthermore arranged a pneumatic device PV7, which substantially corresponds to the pneumatic devices PV1 to PV6, with the difference that the pneumatic device PV7 has multiple bladders B71, B72, B73, B74, B75, wherein one or more bladders of the bladders B71 to B75 may have the characteristic features of one or all bladders B1 to B6.

It is clear from FIG. 7 that, during the filling or evacuation of the bladders B71 to B75, a contour K of the seat bearing surface SAF may be varied in the region of the bladders. For this purpose, it is for example the case that, by means of a pressure medium source DQ, DM is introduced into the bladders B71 to B75, or is extracted from said bladders. A seat lining composed for example of cloth or leather may be provided over the bladders B71 to B75, by means of which seat lining the contour K of the backrest RL, which can be influenced by the bladders B71 to B75, is then formed.

One possible embodiment of a method for producing a pneumatic device such as the pneumatic devices PV1 to PV7 for the variation of a contour of a seat bearing surface of a vehicle seat will be discussed briefly below.

For example, a first foil portion and a second foil portion are provided, the first foil portion and the second foil portion are subsequently connected along at least one first connecting seam, for example by means of a welding process, in particular high-frequency welding process, in order to form a bladder for the variation of the contour of the seat bearing surface of the vehicle seat, having a bladder chamber which can be filled with pressure medium and having an inflow opening for the inflow of the pressure medium into the bladder chamber. Furthermore, the first foil portion and the second foil portion are connected to one another along at least one second connecting seam, which may for example likewise be performed by means of a welding process, in particular high-frequency welding process, in order to form a throttle element arranged within the bladder chamber, which throttle element is designed to throttle, within the bladder chamber, a pressure medium flow flowing in through the inflow opening.

It is possible here for the connection along the first connecting seam and the connection along the second connecting seam to be performed in a single process step or simultaneously. It is also possible for the formation of the damping chamber division element mentioned in conjunction with FIG. 2 to take place in the same process step (for example by welding).

It is furthermore possible to provide a single foil which has a first foil portion and a second foil portion and which is correspondingly folded such that the first foil portion and the second foil portion lie one over the other. In this way, a pneumatic device such as the pneumatic devices PV1 to PV7 discussed in conjunction with FIG. 1 to FIG. 7 can be produced in a simple manner.

The invention claimed is:

1. A pneumatic device for variation of a contour of a seat bearing surface of a vehicle seat, comprising:
   a first foil portion;
   a second foil portion connected to the first foil portion along at least one connecting seam such that a bladder for the variation of the contour of the seat bearing surface, having a bladder chamber configured to be filled with pressure medium and having an inflow opening for inflow of the pressure medium into the bladder chamber, is formed; and
   a throttle element arranged in an interior of the bladder chamber and designed to throttle, within the bladder chamber, a pressure medium flow flowing in through the inflow opening.

2. The pneumatic device as claimed in claim 1, wherein the throttle element divides the bladder chamber into a damping chamber, which has the inflow opening, and a contour variation chamber connected to the damping chamber via a flow transfer opening and which serves for the variation of the contour of the seat bearing surface, and the flow transfer opening is designed such that the pressure medium flow flowing into the damping chamber through the inflow opening is throttled as the pressure medium flow passes from the damping chamber into the contour variation chamber.

3. The pneumatic device as claimed in claim 2, wherein a volume of the damping chamber lies in a range from 0.1% to 30% of the volume of the contour variation chamber.

4. The pneumatic device as claimed in claim 3, wherein the inflow opening and the flow transfer opening have no overlap region in a flow direction of the pressure medium flow.

5. The pneumatic device as claimed in claim 2, wherein the inflow opening and the flow transfer opening have no overlap region in a flow direction of the pressure medium flow.

6. The pneumatic device as claimed in claim 2, wherein at least one of the damping chamber or the contour variation chamber has an element with a sound-absorbing material.

7. The pneumatic device as claimed in claim 2, wherein the pneumatic device furthermore has a damping chamber division element which divides the damping chamber into a first partial chamber and a second partial chamber connected to the first partial chamber, wherein the damping chamber division element is designed to generate a throttling effect between the first partial chamber and the second partial chamber.

8. The pneumatic device as claimed in claim 1, wherein a flow cross section of the flow transfer opening is in a range from 10%-80% of a flow cross section of the inflow opening.

9. The pneumatic device as claimed in claim 1, wherein the throttle element has a flow impingement region directly impinged on by the pressure medium flow flowing in through the inflow opening.

10. The pneumatic device as claimed in claim 9, wherein the flow impingement region has a structure with depressions and elevations, which structure gives rise to a diffuse distribution of the pressure medium flow.

11. The pneumatic device as claimed in claim 1, wherein the throttle element has a flow-guiding portion for the guidance of the pressure medium flow.

12. The pneumatic device as claimed in claim 11, wherein the flow-guiding portion forms, with a wall of the bladder chamber, a flow-guiding channel which widens in the flow direction of the pressure medium flow.

13. The pneumatic device as claimed in claim 1, wherein the throttle element is formed by connection of the first foil portion and of the second foil portion.

14. The pneumatic device as claimed in claim 1, wherein the throttle element has a sound-absorbing material.

15. A vehicle seat comprising:
a seat bearing surface for a user;
a pneumatic device as claimed in claim 1, which pneumatic device is arranged in the vehicle seat in order to vary the contour of the seat bearing surface.

16. The pneumatic device as claimed in claim 1, wherein the second foil portion is directly connected to the first foil portion to form the at least one connecting seam to form the bladder.

17. A method for producing a pneumatic device for variation of a contour of a seat bearing surface of a vehicle seat, comprising:
providing a first foil portion;
providing a second foil portion;
connecting the first foil portion and the second foil portion along at least one first connecting seam in order to form a bladder for the variation of the contour of the seat bearing surface of the vehicle seat, having a bladder chamber configured to be filled with pressure medium and having an inflow opening for inflow of the pressure medium into the bladder chamber; and
connecting the first foil portion and the second foil portion along at least one second connecting seam in order to form a throttle element arranged within the bladder chamber, which throttle element is designed to throttle, within the bladder chamber, a pressure medium flow flowing in through the inflow opening.

18. The method as claimed in claim 17, wherein the first foil portion and the second foil portion are connected to one another along the at least one second connecting seam such that the bladder chamber is divided into a damping chamber, which has the inflow opening, and a contour variation chamber connected to the damping chamber via a flow transfer opening and which serves for the variation of the contour of the seat bearing surface, and the flow transfer opening throttles the pressure medium flow entering the damping chamber through the inflow opening as said pressure medium flow passes from the damping chamber into the contour variation chamber.

19. The method as claimed in claim 18, wherein a pressure medium volume flow entering the contour variation chamber via the flow transfer opening is several times smaller than a pressure medium volume flow entering the damping chamber via the inflow opening, in order to realize the throttling action.

* * * * *